(12) United States Patent
Currie et al.

(10) Patent No.: US 10,494,083 B2
(45) Date of Patent: Dec. 3, 2019

(54) AIRCRAFT FLAP HINGE

(71) Applicant: The Boeing Company, Chicago, IL (US)

(72) Inventors: Andrew S. Currie, Victoria (AU); Tony Sanders, Victoria (AU)

(73) Assignee: The Boeing Company, Chicago, IL (US)

( * ) Notice: Subject to any disclaimer, the term of this patent is extended or adjusted under 35 U.S.C. 154(b) by 354 days.

(21) Appl. No.: 15/356,693

(22) Filed: Nov. 21, 2016

(65) Prior Publication Data

US 2018/0141636 A1 May 24, 2018

(51) Int. Cl.
*B64C 9/02* (2006.01)
*B64C 3/50* (2006.01)
*F16C 11/04* (2006.01)
*B64C 9/18* (2006.01)

(52) U.S. Cl.
CPC ............... *B64C 9/02* (2013.01); *B64C 3/50* (2013.01); *F16C 11/04* (2013.01); *B64C 9/18* (2013.01); *Y02T 50/32* (2013.01); *Y02T 50/44* (2013.01)

(58) Field of Classification Search
CPC ..... B64C 9/02; B64C 3/50; B64C 9/18; F16C 11/04; Y02T 50/32; Y02T 50/44
See application file for complete search history.

(56) References Cited

U.S. PATENT DOCUMENTS

| | | |
|---|---|---|
| 3,853,289 A | 12/1974 | Nevermann et al. |
| 3,985,319 A | 10/1976 | Dean et al. |
| 4,434,959 A | 3/1984 | Rudolph |
| 4,448,375 A | 5/1984 | Herndon |
| 4,605,187 A | 8/1986 | Stephenson |
| 4,669,687 A | 6/1987 | Rudolph |
| 4,702,442 A | 10/1987 | Weiland et al. |
| 4,995,575 A | 2/1991 | Stephenson |
| 5,161,757 A | 11/1992 | Large |
| 5,915,653 A | 6/1999 | Koppelman |

(Continued)

FOREIGN PATENT DOCUMENTS

| | | |
|---|---|---|
| DE | 2037933 A1 | 2/1972 |
| EP | 3034393 A1 | 6/2016 |

OTHER PUBLICATIONS

Extended European Search Report in European Patent Application No. 17202633.8 dated Feb. 1, 2018.

*Primary Examiner* — Assres H Woldemaryam
(74) *Attorney, Agent, or Firm* — Ostrager Chong Flaherty & Broitman PC

(57) ABSTRACT

Aerodynamic drag associated with a flap hinge assembly used to pivotally mount a flap to the trailing edge of an aircraft wing can be reduced when the cross-sectional area of the hinge fairing which surrounds the flap hinge assembly is reduced in size. The reduction in cross-sectional area of the hinge fairing is enabled when the flap hinge assembly attachment footprint to the underside of the flap box is also reduced. The flap hinge assembly has an internal support rib positioned between spars of the flap box structure internal to the skin, a hinge fitting exhibiting an actuation point and a hinge point positioned proximate a front spar of the flap box structure external to the skin, and a link passing through an aperture in the lower skin of the flap and coupling the internal support rib to the hinge fitting.

20 Claims, 13 Drawing Sheets

(56) References Cited

U.S. PATENT DOCUMENTS

| | | | | |
|---|---|---|---|---|
| 7,762,500 B1* | 7/2010 | Dhall | ............... | B60F 5/02 244/123.1 |
| 9,227,722 B2 | 1/2016 | Soenarjo | | |
| 2012/0012696 A1 | 1/2012 | Sakurai et al. | | |
| 2013/0075537 A1* | 3/2013 | Sakurai | ............... | B64C 9/16 244/216 |
| 2014/0346282 A1* | 11/2014 | Aljets | ............... | B64C 9/04 244/217 |
| 2016/0251074 A1 | 9/2016 | Tsai | | |

* cited by examiner

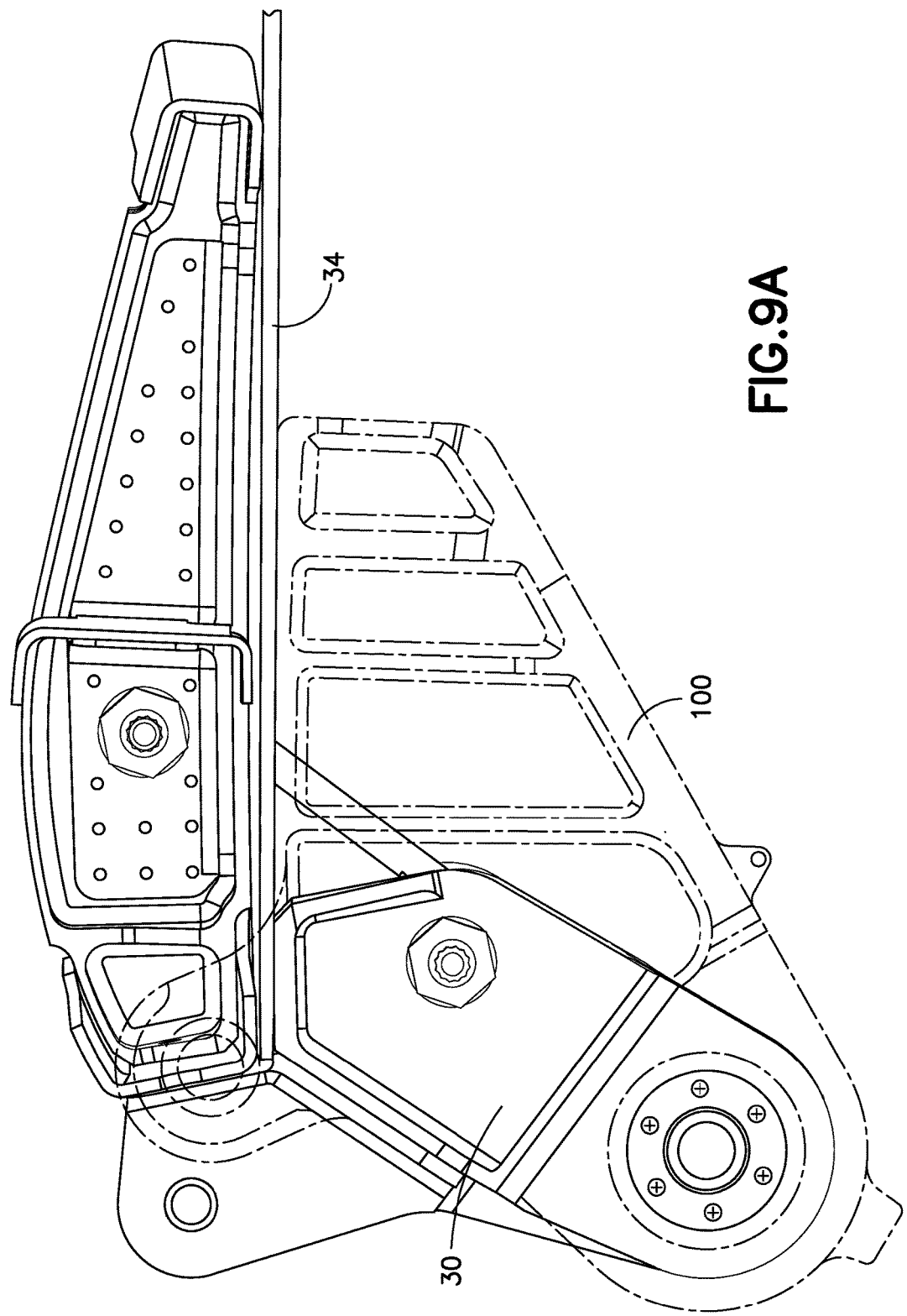

AIRCRAFT FLAP HINGE

TECHNICAL FIELD

This disclosure relates generally to trailing edge wing flaps for aircraft, and support structures for deploying trailing edge wing flaps. More particularly, the disclosure relates to a flap hinge assembly having a small footprint for pivotally mounting a wing flap to a trailing edge of an aircraft wing which can be enclosed in a relatively small aerodynamic fairing.

BACKGROUND

Aircraft typically have one or more flaps movably attached to a trailing edge of a fixed wing structure. Such trailing edge wing flaps perform two functions: (a) to provide a high lift-to-drag ratio take-off configuration, and (b) to provide a high lift coefficient landing configuration. A high lift-to-drag ratio for take-off can be accomplished by trailing edge wing flap positions with (a) high Fowler motion (i.e. aft motion which increases wing projected area), (b) a single short and converging slot and, (c) a small flap deflection angle. The high lift coefficient for landing requires (a) high Fowler motion, (b) a short converging slot between the flap and the wing (and two such slots for double slotted flap configuration) and, (c) high flap deflection angles. Theoretically, the best Fowler motion versus flap deflection angle progression would be that the flap would initially move rearward with little or no rotation, and at the end of its rearward travel deflect downwardly for the landing configuration. A flap support structure that approaches this motion as closely as possible is the most desirable.

Many different flap support structures have been developed to guide and drive a trailing edge wing flap between its stowed and take-off and landing configurations, most of which incorporate a number of complex mechanical linkages. Such flap support structures are typically located on an undersurface of the flaps and therefore extend into the airstream below the lower aft edge of the wing, causing undesirable drag. Airplane performance is enhanced through minimizing drag, which can be directly correlated to a dollar saving for the airplane operator. To reduce drag, flap support structures are covered with an aerodynamic fairing, which is attached to the undersurfaces of the wing and the flap. To further minimize drag, it is desirable that the fairing exhibit a small and narrow cross-sectional area (i.e., the projected fairing area in a streamwise direction). Aerodynamic fairings having a narrow cross-sectional area are a feature of the outboard flaps on a Boeing 777X aircraft. To achieve the narrow fairing, the flap hinge fitting that connects the flap to the trailing edge of the Boeing 777X wing is cranked to result in an attachment footprint on the undersurface of the flap that is bent to remain within the narrow fairing loft and includes a number of tension joints, inefficient load paths and associated increased weight and manufacturing complexity.

There is a need in the art for improved support structures for deploying trailing edge wing flaps that have a simple, lighter weight structure with more efficient load paths and a smaller attachment footprint on the undersurfaces of the wing and the flap to permit use of aerodynamic fairings having a narrow cross-sectional area, to minimize drag and provide other advantages over known configurations, structures and methods.

SUMMARY

The foregoing purposes, as well as others, are achieved by a lightweight flap hinge assembly having a small external footprint on an undersurface of a flap for pivotally mounting the flap to a trailing edge of an aircraft wing. The flap hinge assembly has particular application to aircraft wings having a swept-wing structure that forms an acute angle with respect to the portion of the aircraft aft of the wing. The flap hinge assembly is integrated with an internal support rib of the flap, and a link that passes through an aperture in a lower skin of the flap and couples the internal support rib within the flap to a hinge fitting positioned external to an undersurface of the flap. Thus, the structural bulk of the flap hinge assembly is moved from the external undersurface of the flap box to inside of the flap box. This configuration permits a hinge fitting external to the flap to have a smaller attachment footprint (i.e., smaller area on the undersurface of the flap) than typical hinge fittings and enables the use of an aerodynamic fairing having a more narrow cross-sectional area to minimize drag. The flap hinge assembly also displays a relatively determinant load path allowing reduced reliance on fine element modeling (FEM) for internal load calculation and a corresponding reduction in non-recurring analysis costs, thus reducing cost and providing manufacturing and flight efficiencies.

In one aspect of the disclosure, a flap hinge assembly is provided for pivotally mounting a flap to a trailing edge of an aircraft wing. The flap is of the type having a flap box structure comprising multiple spars, a plurality of ribs connecting between spars, and a skin surrounding the flap box structure. The flap hinge assembly comprises an internal support rib positioned between a front spar and either an aft spar or mid spar of the flap box structure internal to the skin. A hinge fitting is positioned proximate the front spar of the flap box structure external to the skin, and exhibits an actuation point and a hinge point. A link passes through an aperture in the lower skin of the flap and couples the internal support rib to the hinge fitting. The link comprises a generally elongated structure having a first hole and a second hole at respective ends of the link, the first hole and the second hole being coupled to the internal support rib and the hinge fitting respectively via pin joints acting in double shear. The hinge fitting extends external to the lower skin a chordwise distance from the front spar that is less than a distance between the front spar and a mid spar of the flap, thus providing a small footprint on the undersurface of the flap.

Another aspect of the disclosure relates to a trailing edge flap for an aircraft wing having a flap hinge assembly integrated into the trailing edge flap as described above.

In other aspects of the disclosure, the hinge fitting of the flap hinge assembly that is positioned external to the skin comprises a generally horizontal load transfer face and a generally vertical load transfer face positioned respectively about a generally horizontal flange of the front spar and a generally vertical web of the front spar. The generally horizontal load transfer face of the hinge fitting has a first length that is approximately equal to a second length of the generally horizontal flange of the front spar, and the generally vertical load transfer face of the hinge fitting has a third length that is approximately equal to a fourth length of the generally vertical web of the front spar.

In yet other aspects of the disclosure, a method of reducing an external footprint of a support structure for pivotally mounting a flap to a trailing edge of an aircraft wing is disclosed. The method provides for a smaller external footprint of the support structure attached to the undersurface of the flap and permits use of a fairing having a narrow cross-sectional area. In the method, an internal support rib of the support structure is positioned between the spars of the flap internal to the flap skin. A hinge fitting exhibiting an actuation point and a hinge point is positioned proximate the front spar external to the flap skin. A link is passed through an aperture in the lower skin of the flap and coupled to the internal support rib and the hinge fitting, such that the bulk of the support structure is internal to the flap, and the external components of the support structure have a small external footprint.

The features, functions and advantages that have been discussed, as well as other objects, features, functions and advantages of the flap hinge assembly and trailing edge flap can be achieved independently in various examples of the disclosure or may be combined in yet other examples, further details of which can be seen with reference to the following description and drawings.

BRIEF DESCRIPTION OF DRAWINGS

FIGS. 9A and 9B are views looking inboard along the flap hingeline, and up respectively, comparing the smaller attachment footprint of the disclosed flap hinge assembly and the larger footprint of a prior art flap hinge assembly.

DETAILED DESCRIPTION

Figure 1A:
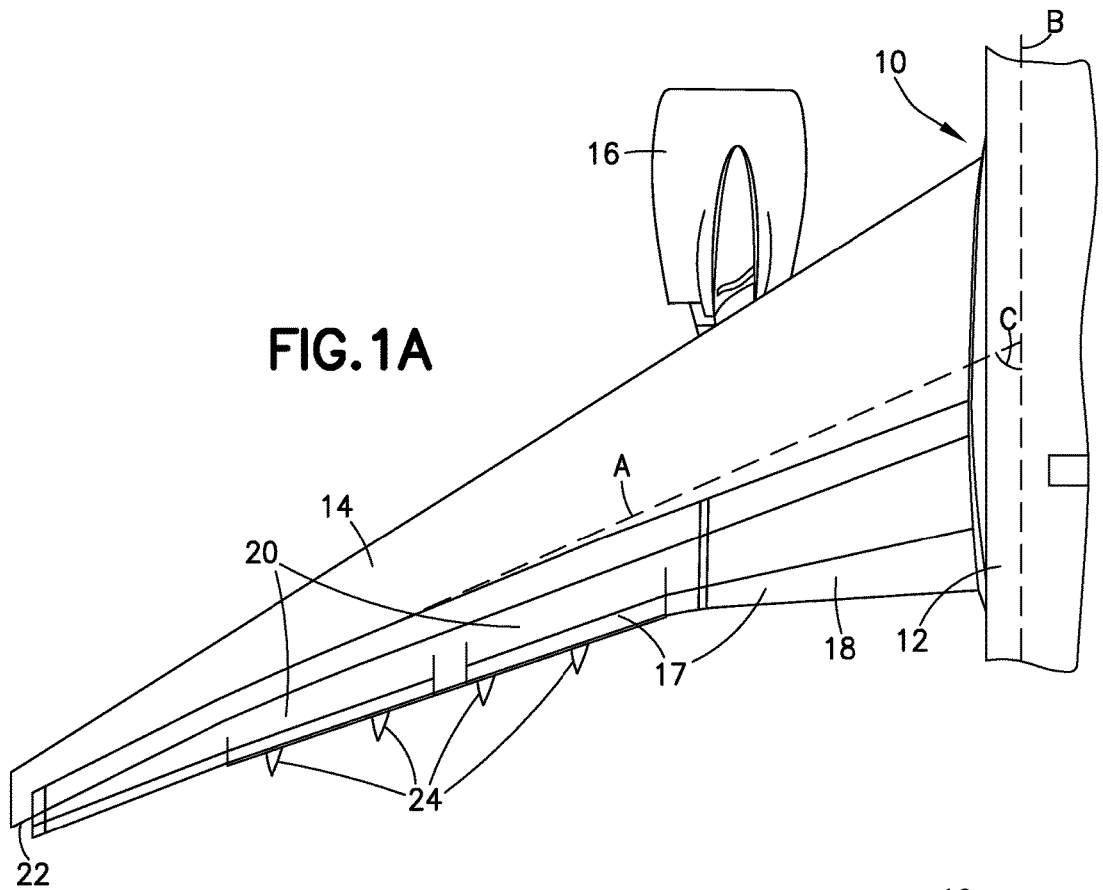
FIG. 1A is a partial view looking down on an aircraft showing the aircraft's left wing.
Figure 1B:
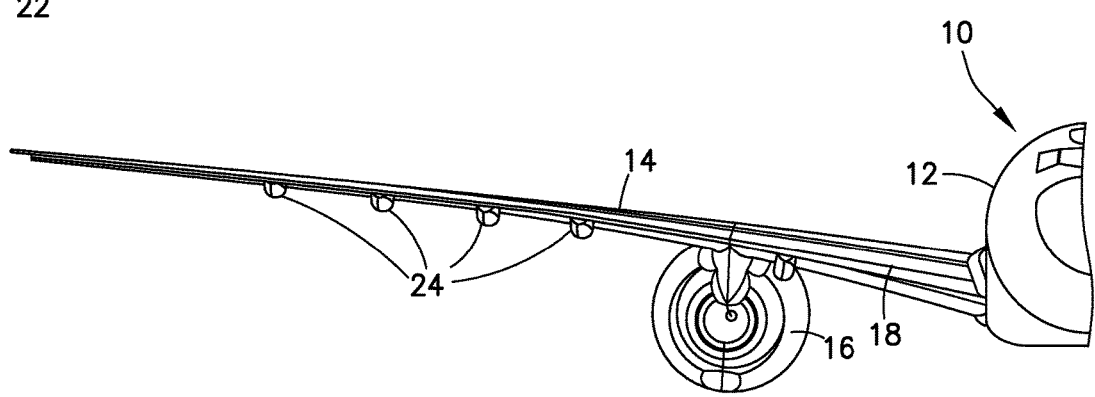
FIG. 1B is a partial view looking forward on the aircraft left wing shown in FIG. 1A.

In the following detailed description, various examples of a flap hinge assembly are described with reference to aerospace structures, and more particularly to swept-wing aircraft of the type shown for example in FIGS. 1A and 1B, to illustrate the general principles of the present disclosure. The description is merely exemplary in nature and is not intended to limit the disclosed flap hinge assembly or the application and uses of the disclosed flap hinge assembly. It will be recognized by one skilled in the art that the present disclosure may be practiced in other analogous applications or environments and/or with other analogous or equivalent variations of the illustrative examples. For example, although the aircraft wing shown in FIGS. 1A and 1B is generally representative of wings used for commercial passenger aircraft, the teachings of this disclosure may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable structures having surfaces that move relative to one another under a load. It should be noted that those methods, procedures, components, or functions which are commonly known to persons of ordinary skill in the field of the disclosure are not described in detail herein.

FIGS. 1A and 1B illustrate partial top and rear views, respectively, of an exemplary aircraft 10 having a fuselage 12, a wing 14, and an under-wing mounted engine 16. The wing 14 is of a type having a swept-wing structure, wherein a wing axis (shown by dotted line A in FIG. 1A) of the wing 14 forms an acute angle C with respect to a lengthwise axis (shown by dotted line B) of the fuselage 12. The wing 14 has a plurality of trailing edge flaps 17, including inboard flap 18 and one or more outboard flap(s) 20, all movably mounted to the wing fixed trailing edge 22. The flaps 17 are supported by and moveable with respect to the wing fixed trailing edge 22 by multiple flap support structure (not shown in FIGS. 1A and 1B), each of which are covered with an aerodynamic fairing 24 to minimize drag during flight. The fairing 24 is attached to undersurfaces of the wing 14 and the flaps 17. In typical aircraft like the aircraft 10, the flap support structures are positioned on the undersurface of the flaps 17, in whole or in part, generally normal to the wing axis A of the wing 14. To provide the most aerodynamic fairings 24, the fairings are preferably positioned in a streamwise direction generally parallel to the lengthwise axis B of the fuselage 12 and, for the outboard flaps 20, at the acute angle C (not normal) relative to the wing axis A of the wing 14. Therefore, at least for the outboard flaps 20, the fairings 24 must be wide enough to cover an angled width of the flap support structure.

Figure 9B:
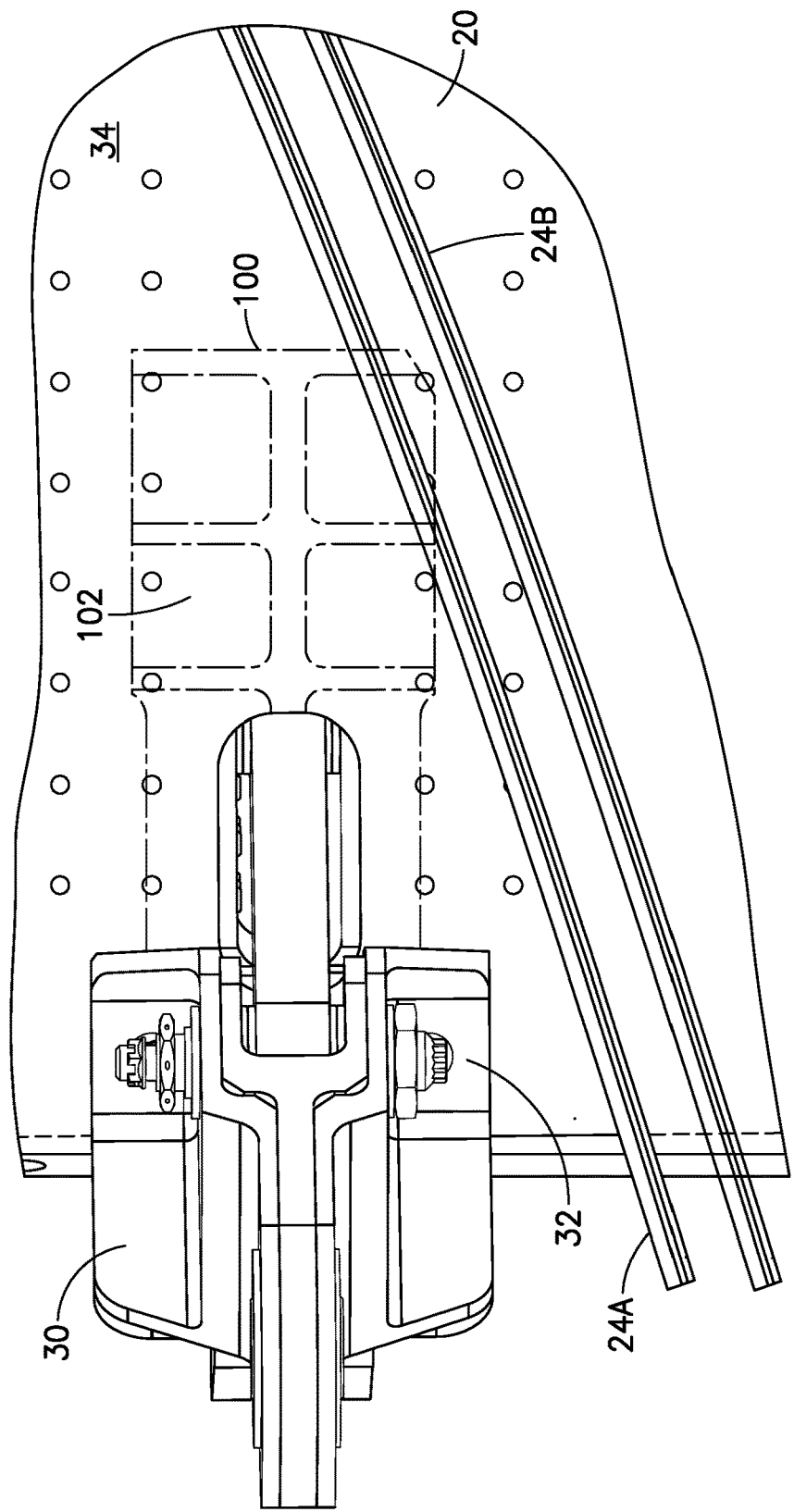

The disclosed flap hinge assembly 30 is an improved type of flap support structure that has a smaller attachment footprint 32 (i.e., smaller area on the undersurface of the flaps 17), permitting the aerodynamic fairing 24 to have a smaller cross-sectional area 26, which further minimizes drag during flight and increases overall aircraft efficiency. FIGS. 9A and 9B are illustrations showing the smaller attachment footprint 32 of the flap hinge assembly 30 to the undersurface 34 of an outboard flap 20 as compared, for example, to the larger footprint 102 of a standard straight hinge fitting type of flap support structure 100 (a standard straight hinge fitting) on an outboard flap 20 of a Boeing 787-9 aircraft (FIG. 9A shows a view looking inboard along the hingeline; FIG. 9B shows a view looking up on the undersurface 34 of outboard flap 20). Fairing edges 24A and 24B of two fairings 24 are depicted to illustrate the corresponding size difference of the fairings 24. The fairing used with the flap hinge assembly 30 of this disclosure has a narrower cross-section than the fairing used with the flap support structure 100, which must be wider to accommodate the larger footprint 102 of the typical flap support structure 100 (fairing edge 24A is closer than fairing edge 24B to the flap hinge assembly 30). This permits the fairing 24 used with the flap hinge assembly 30 to have a smaller cross-sectional area 26 with reduced drag and improved aerodynamics. The flap hinge assembly 30 has particular application on outboard flaps 20 where the acute angle C is formed by the fairings 24 relative to the wing axis A of the wing 14.

However, the flap hinge assembly 30 may also replace a typical support structure for the inboard flap 18, which is generally positioned to be parallel to the streamwise direction and the lengthwise axis B of the fuselage 12.

Figure 2:
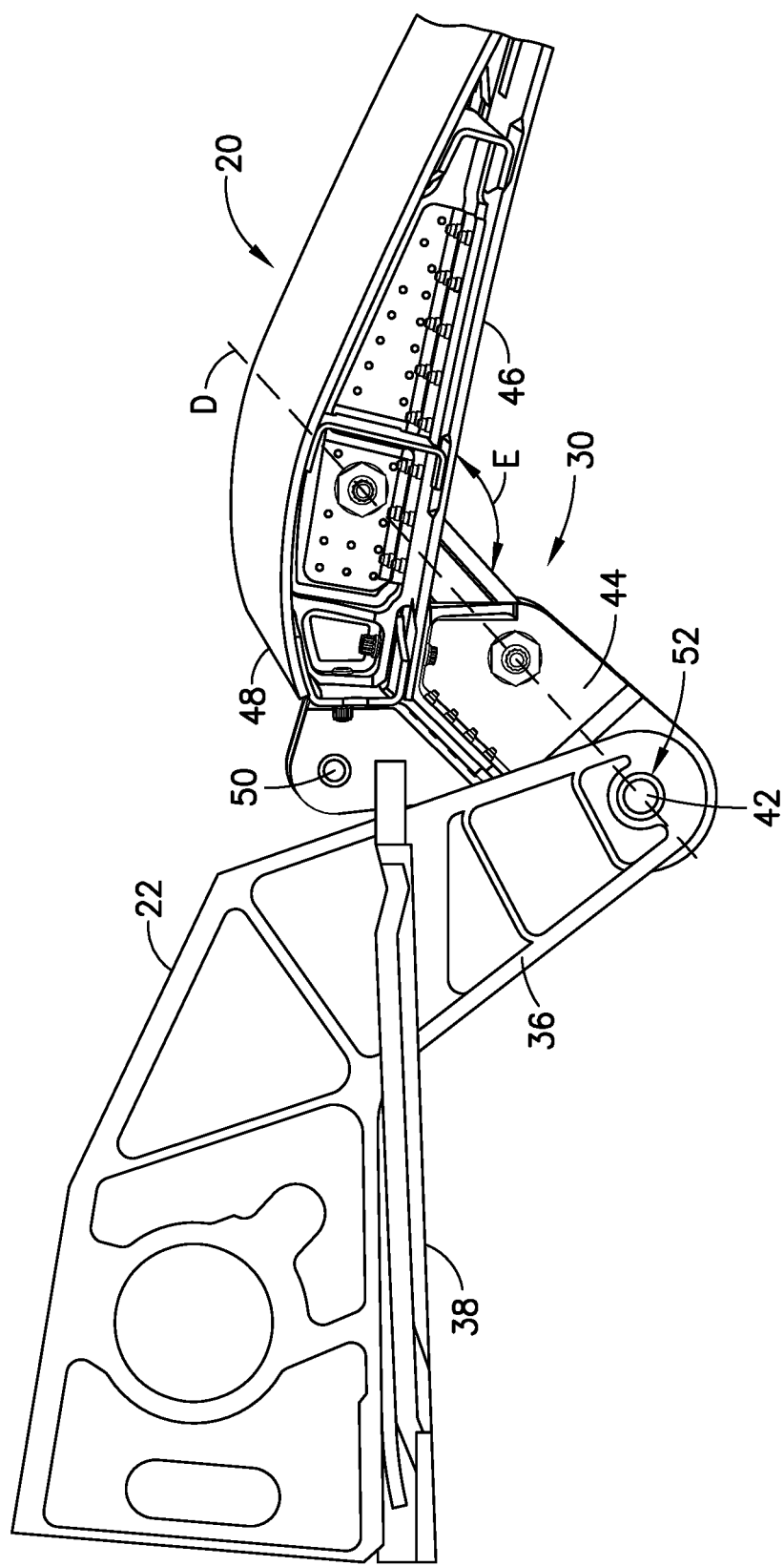
FIG. 2 is partial cut-away side view of a flap hinge assembly connecting an aircraft flap to a trailing edge of an aircraft wing.
Figure 3:
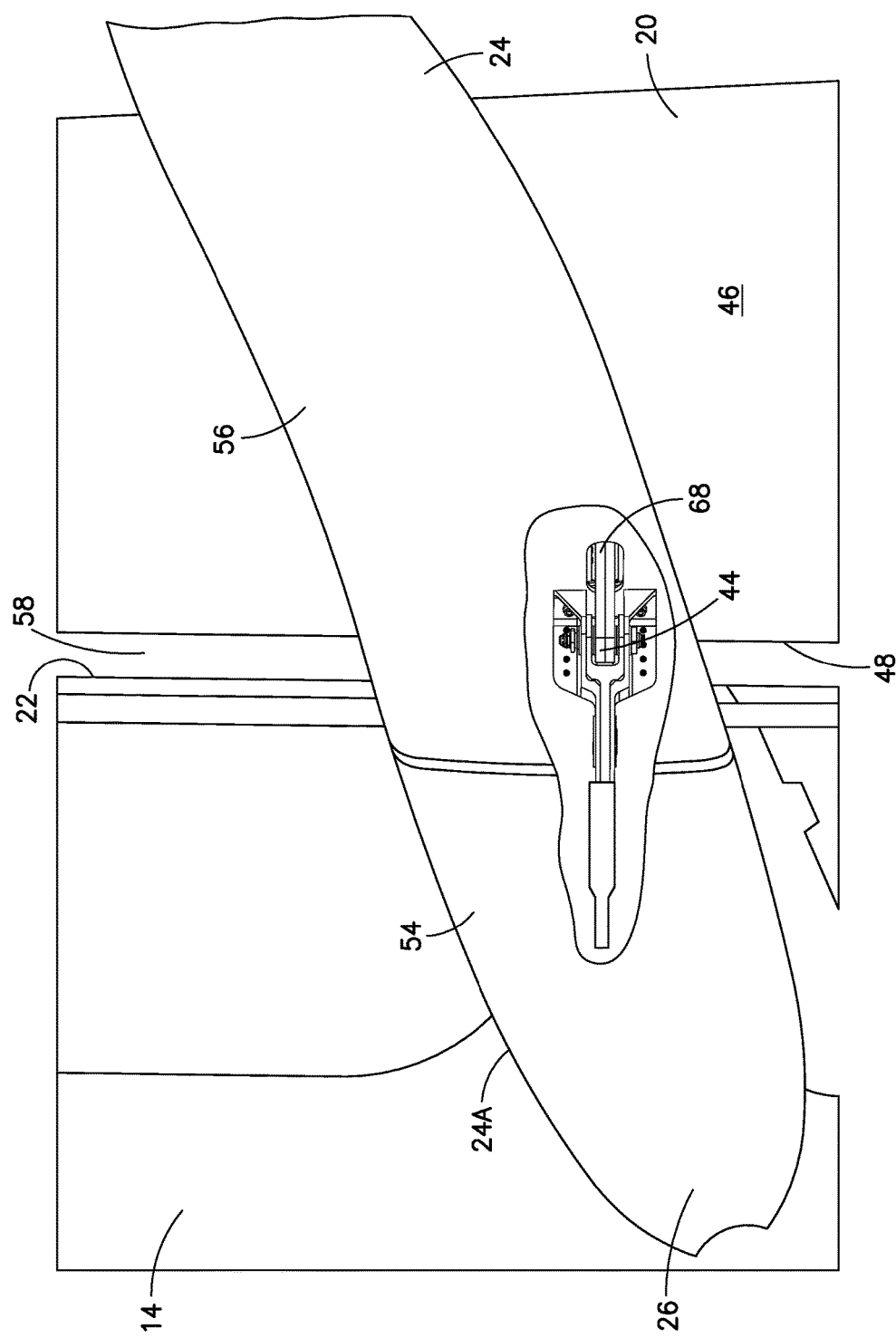
FIG. 3 is a partial view looking up on an aircraft wing with a flap extending from a trailing edge surface of the wing, and an aerodynamic fairing affixed to the wing and the flap.
Figure 4:
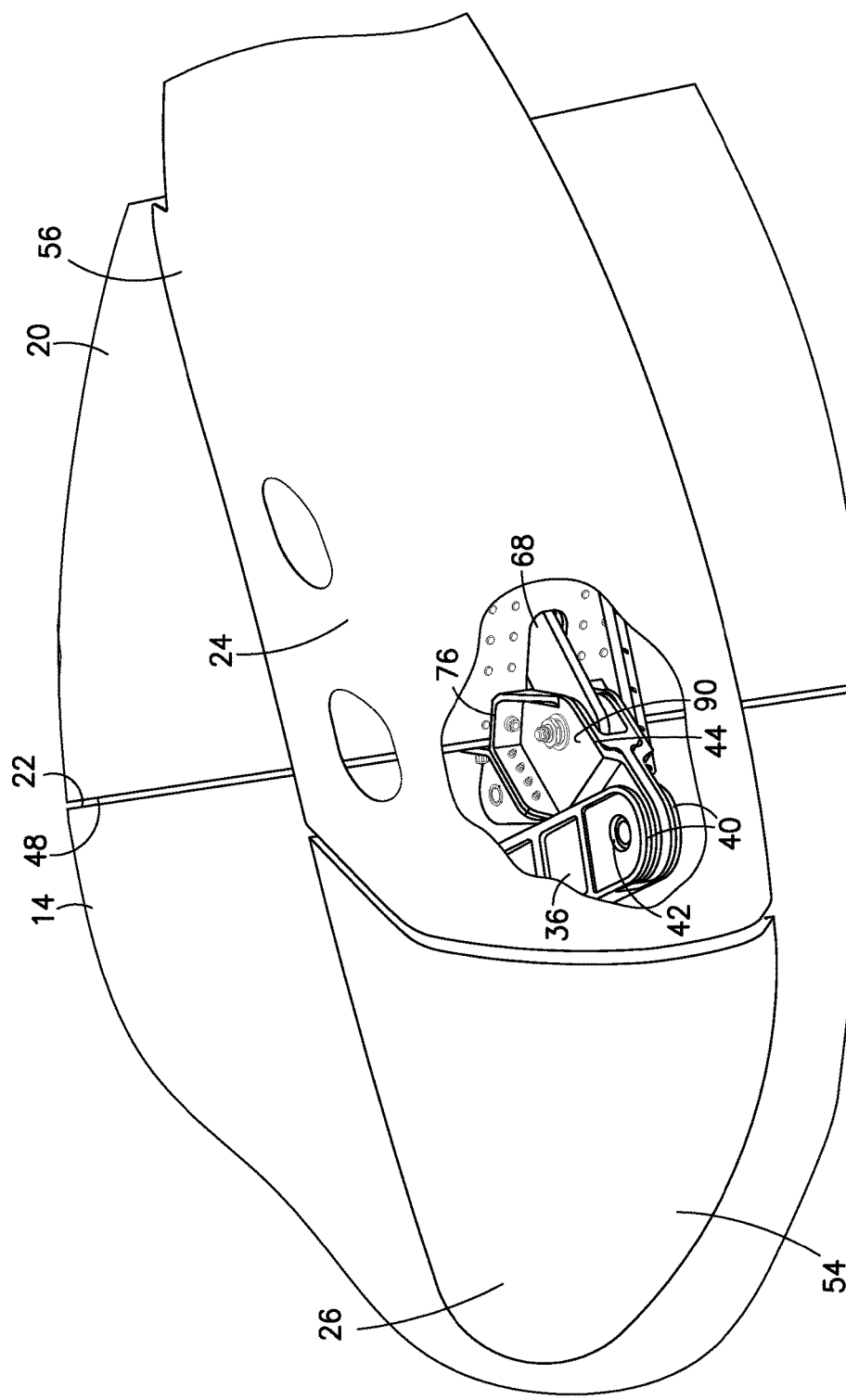
FIG. 4 is a partial view looking up, inboard and forward on a flap hinge assembly connecting an aircraft wing to an aircraft flap.

Referring to FIGS. 2-4, the flap hinge assembly 30 movably connects one of the flaps 17 to a wing fixed trailing edge 22 of a wing 14. For purposes of this example, the drawings refer to an outboard flap 20, but the concepts are the same for an inboard flap 18 or other types of aerospace structures. The trailing edge 22 of the wing 14 is typically equipped with a wing hinge structure 36 extending aft from the trailing edge 22 below the wing lower skin 38 and terminating with a pair of spaced-apart pivot lugs 40 at a distal end of the trailing edge hinge structure 36 for connection to the outboard flap 20. The flap hinge assembly 30 has a hinge fitting 44 extending below a flap lower skin 46 and typically forward of a forward edge 48 of the outboard flap 20. The hinge fitting 44 has an actuation point 50 proximate an upper end of the hinge fitting 44 and a flap hinge point 52 proximate a lower end of the hinge fitting 44, both positioned forward of the forward edge 48 of the outboard flap 20. The spaced-apart pivot lugs 40 of the wing hinge structure 36 of the wing 14 are pivotally connected to the flap hinge point 52 via any type of pivoting pin through aligned holes 42 in both the spaced-apart pivot lugs 40 and the flap hinge point 52. A space 58 is provided between trailing edge 22 of the wing 14 and the forward edge 48 of the outboard flap 20. An aerodynamic fairing 24 is attached at its edges 24A to the undersurface 34 of the outboard flap 20 to cover the wing hinge structure 36 and the hinge fitting 44 of the outboard flap 20. The aerodynamic fairing 24 may be comprised of a front fairing 54 attached to the wing 14 and an aft fairing 56 attached to the outboard flap 20 to facilitate relative movement of the outboard flap 20 in relation to the wing 14. As shown in FIG. 3, the fairing 24 is attached to the wing 14 and the outboard flap 20 at an angle relative to the flap hinge assembly 30 and the trailing edge 22 of the wing 14 to position the fairing 24 in a streamwise direction. The small footprint 32 of the flap hinge assembly 30 permits the fairing 24 to have a narrow cross-sectional area 26 in this configuration to minimize drag and improve aerodynamic efficiencies.

Figure 5:
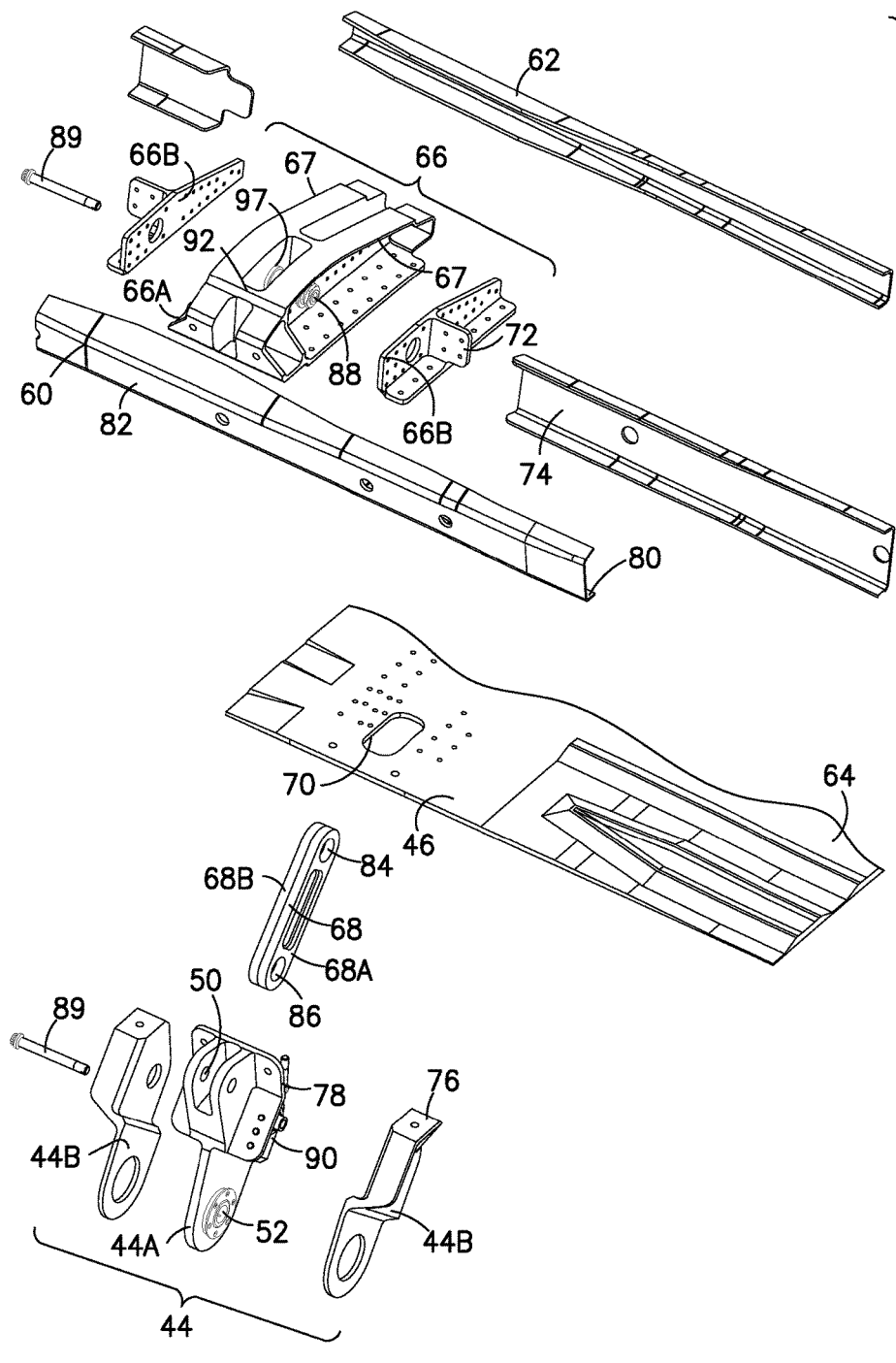
FIG. 5 is an exploded isometric view of the flap hinge assembly and partial exploded view of the surrounding flap structure.
Figure 6:
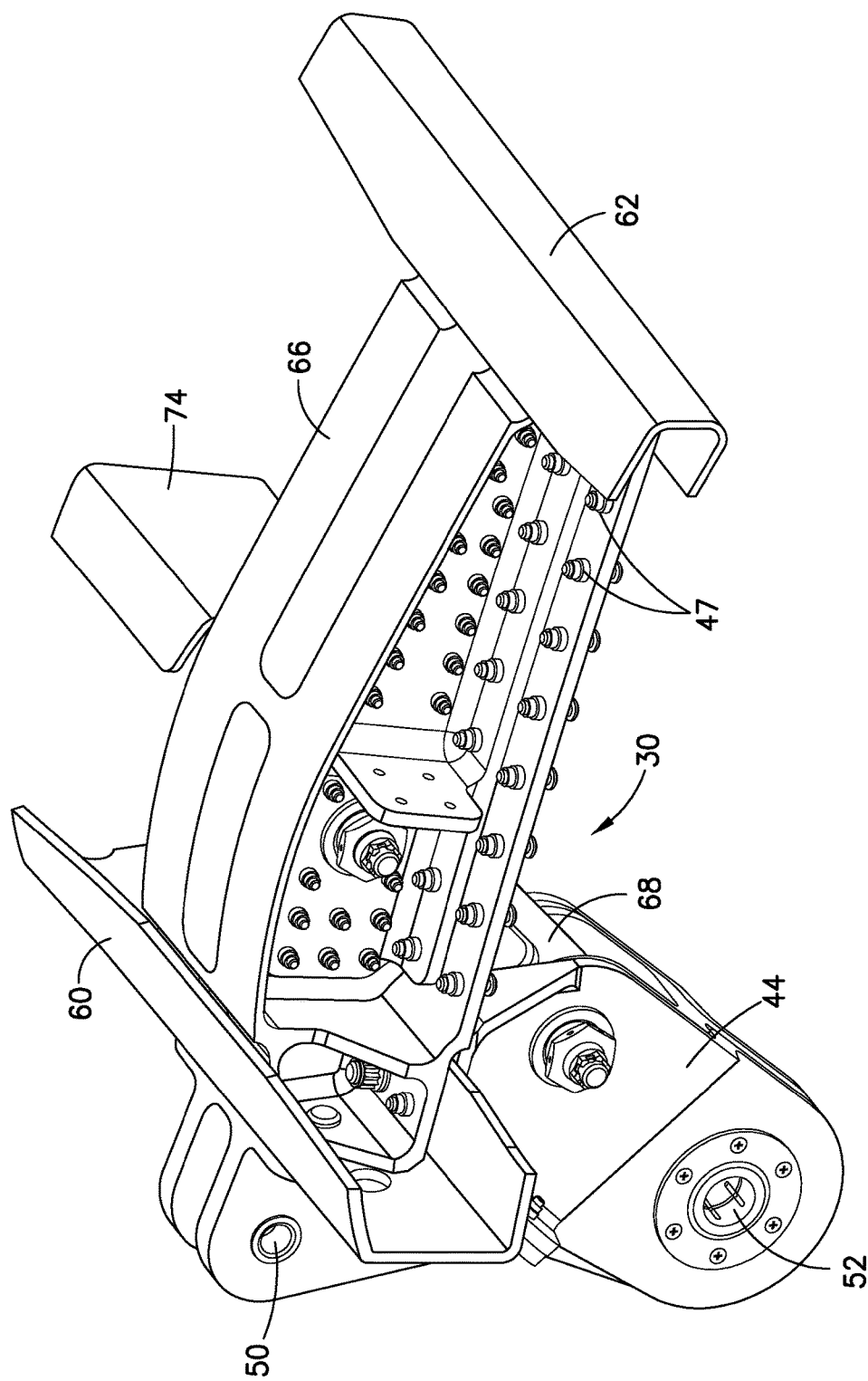
FIG. 6 is an isometric view looking down, inboard and forward on the flap hinge assembly.

The flap hinge assembly 30 for pivotally mounting flaps 17 to the trailing edge 22 of an aircraft wing 14 is shown in further detail in FIGS. 5-8. The inboard flap 18 and outboard flap 20 are of the type having a flap box structure comprising a front spar 60, an aft spar 62 and a plurality of ribs connecting the front spar 60 and aft spar 62. A flap skin 64 surrounds the flap box structure to enclose the front spar 60, an aft spar 62 and the plurality of ribs. To provide the smaller attachment footprint 32 of the hinge fitting 44 external to the flaps 17, the structural bulk of the flap hinge assembly 30 is moved from the external undersurface 34 of the flaps 17 to inside the flap skin 64. An internal support rib 66 is positioned between the front spar 60 and either the aft spar 62 or a mid spar 74 of the flap box structure internal to the flap skin 64 to provide structural support to the hinge fitting 44, which is positioned proximate the front spar 60 of the flap box structure external to the skin 64. A link 68 passes through an aperture 70 in a lower skin 46 of the flap skin 64 and couples the internal support rib 66 to the hinge fitting 44. The internal support rib 66 and the hinge fitting 44 may each be composed of a primary and secondary parts to provide alternative load paths in structures as is typical in the art. As shown in FIG. 5, the internal support rib 66 is composed of a primary rib 66A and two secondary ribs 66B positioned on the sides of the primary rib 66A; and the hinge fitting 44 is composed of a primary fitting 44A and two secondary fittings 44B positioned on the sides of the primary fitting 44A. The internal support rib 66 is attached to the flap lower skin 46 with fasteners 47, which may be any type of fastener suitable for aerospace applications.

The internal support rib 66, or as shown the secondary ribs 66B, includes a mid spar attachment point 72 on a side of the internal support rib 66 for attaching the mid spar 74 within the flap box structure. The mid spar 74 is positioned to be generally parallel to and between the front spar 60 and the aft spar 62. The hinge fitting 44 is positioned to extend external to the lower skin 46 a chordwise distance from the front spar 60 that is less than a distance between the front spar 60 and the mid spar 74. This small chordwise distance contributes to the smaller attachment footprint 32 of the flap hinge assembly 30 on the undersurface 34 of the flaps 17.

To further contribute to the smaller attachment footprint 32 and improve the load transfer properties of the flap hinge assembly 30, the hinge fitting 44 has a generally horizontal load transfer face 76 and a generally vertical load transfer face 78 positioned respectively about a lower generally horizontal flange 80 of the front spar 60 and a generally vertical web 82 of the front spar 60. The generally horizontal load transfer face 76 of the hinge fitting 44 has a first length that is approximately equal to a second length of the lower generally horizontal flange 80 of the front spar 60, and the generally vertical load transfer face 78 of the hinge fitting 44 has a third length that is approximately equal to a fourth length of the generally vertical web 82 of the front spar 60. The generally horizontal load transfer face 76 and the vertical load transfer face 78 typically transfer load via compression contact with the flap box (rather than tension), which further enhances the load transfer properties of the flap hinge assembly 30.

Figure 7:
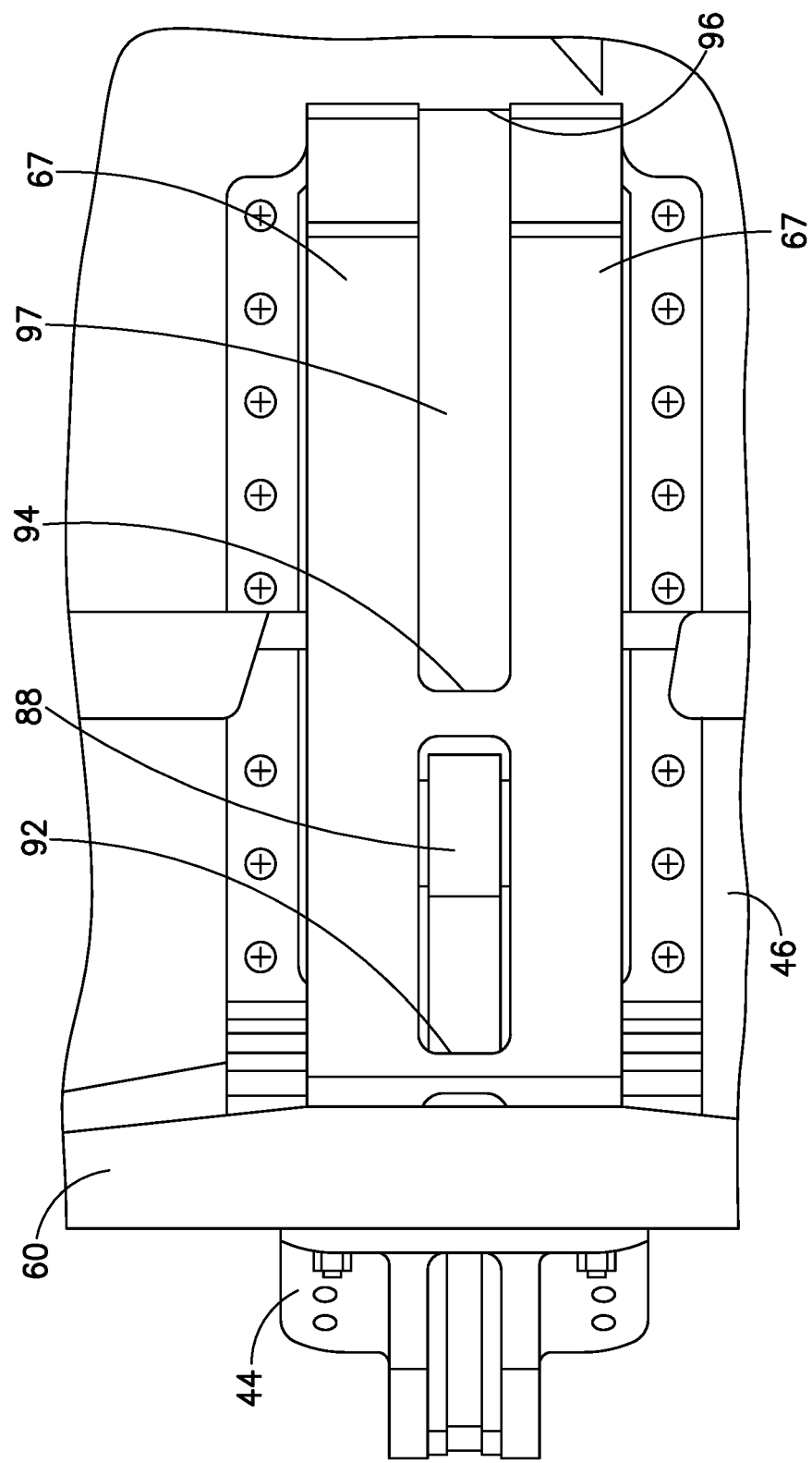
FIG. 7 is a view looking down on the flap hinge assembly.
Figure 8:
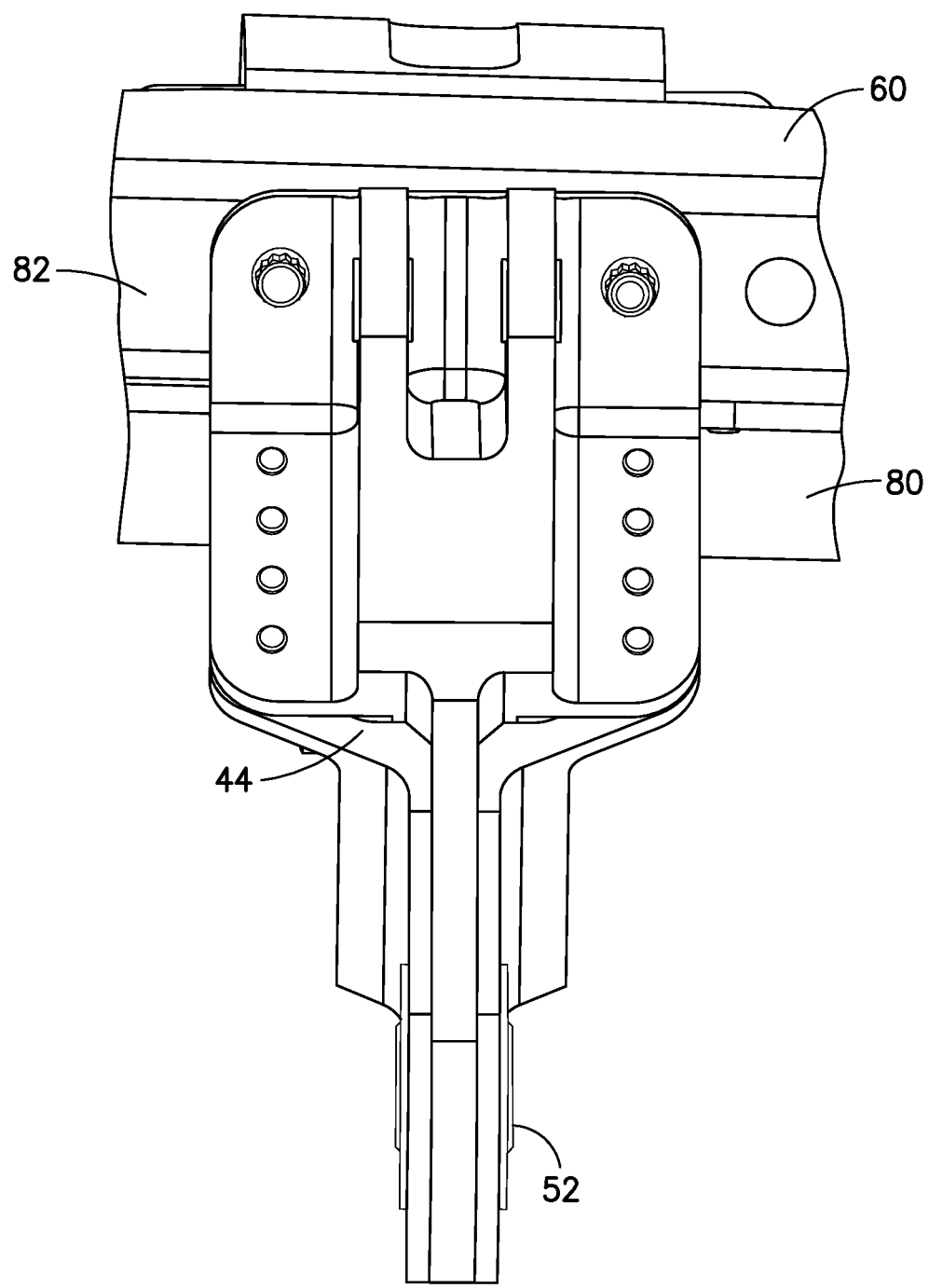
FIG. 8 is a view looking aft on the flap hinge assembly.

The link 68 that connects the hinge fitting 44 to the internal support rib 66 comprises a generally elongated structure having a first hole 84 and a second hole 86 at respective ends of the link 68. The link 68 may be formed as a unitary structure or may be formed with a primary link 68A and a secondary link 68B in back to back configuration as shown in FIG. 5. The first hole 84 and the second hole 86 of the link 68 are coupled to the internal support rib 66 and the hinge fitting 44 via any type of pin joint 89 known in the art, for example, a pin-in-pin joint acting in double shear (held on both sides of the pin). The internal support rib 66 comprises a link attachment point 88 positioned proximate the mid spar attachment point 72, and between the front spar 60 and the mid spar 74, for coupling the first hole 84 of the link 68 to the internal support rib 66. Referring to FIG. 7, the link attachment point 88 may be formed by structuring the internal support rib 66 with two spaced-apart chordwise webs 67 connected together at a front region 92, a mid region 94 and an aft region 96 to form spaces 97 between the two chordwise webs 67. The link 68 is coupled in one of the spaces 97 formed between the front region 92 and the mid region 94. The hinge fitting 44 comprises a connection flange 90 for coupling the second hole 86 of the link 68 to the hinge fitting 44. The connection flange 90 is positioned between the hinge point 52 and the generally horizontal load transfer face 76 of the hinge fitting 44.

When the hinge fitting 44 is connected to the internal support rib 66 through the link 68, the first hole 84 and the second hole 86 of the link 68 and the hinge point 52 in the hinge fitting 44 are aligned in a substantially straight line D, shown in FIG. 2. The straight line D forms an aft angle E relative to the lower skin that is greater than 90 degrees and less than about 135 degrees to further provide the smaller attachment footprint 32.

The foregoing structural features all contribute to the smaller attachment footprint 32 of the flap hinge assembly 30. The volume of the external structure of the flap hinge assembly 30 (including the hinge fitting 44 and part of the link 68 is about 120 cubic inches, which is substantially less the external structure volume of a kinked or cranked design (about 250 cubic inches) or a straight hinge (about 150 cubic inches), resulting in the ability to use a fairing 24 that has a width of 21 inches, which is approximately 15% reduced as compared to a width of the fairing required for a typical straight hinge, and therefore a reduced cross-sectional area 26. This smaller attachment footprint 32 also results in a weight reduction for each flap hinge assembly 30 of about 21% as compared to the weight of a kinked or cranked design (about 43 pounds as compared to about 52 pounds), and about 140 pounds reduction for an aircraft of a size similar to the Boeing 777.

Figure 10:
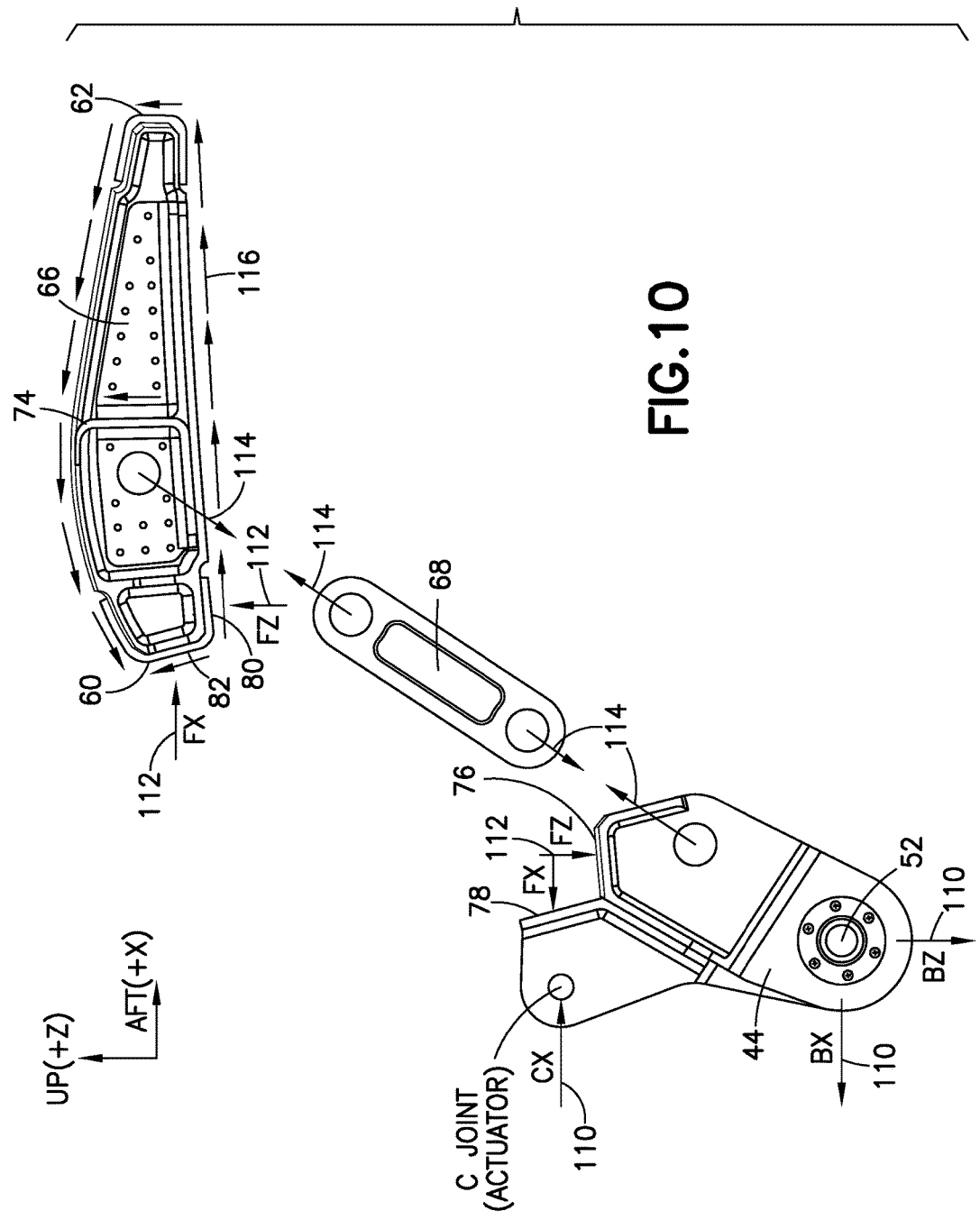
FIG. 10 is an exploded side view (looking inboard along the hingeline) of the flap hinge assembly showing a typical load path.

The design of a the flap hinge assembly also offers a determinant load path, which simplifies structural analysis through reduced reliance on FEM for internal load calculations, provides a corresponding reduction in non-recurring analysis costs, and provides a weight savings when compared to existing designs. The flap hinge assembly 30 provides for a more efficient load transfer through shear joints at the connection flange 90 in the hinge fitting 44 and the link attachment point 88 in the internal support rib 66, and compression joints at the generally horizontal load transfer face 76 and the vertical load transfer face 78 of the hinge fitting 44, instead of numerous tension joints typically used to connect straight or cranked hinges to the undersurface 34 of the flaps 17, and avoids use of heavier and inefficient "bathtub" type tension joints. FIG. 10 is an exploded side view of the flap hinge assembly 30 showing the efficient load paths through the hinge fitting 44, the link 68 and the internal support rib 66, including flap attachment interface loads 110, compression loads 112, tension load 114 through the link 68 and shear load 116 around the internal support rib 66. Under typical air loading, the flap-hinge moment is reacted as a couple between the link 68 (tension load) and the generally horizontal load transfer face 76 and the vertical load transfer face 78, which contact the lower horizontal flange 80 and vertical web 82 of the front spar 60, where the compression load 112 results. The primary load (CX) of the flap attachment interface load 110 is applied at the actuation point 50 and acts in the x direction. This load is reacted as horizontal compression load (FX) applied against the vertical load transfer face 78, which is in contact with the vertical web 82 of the front spar 60. A vertical compression load (FZ) exists at the generally horizontal load transfer face 76 where compression occurs through a forward region of the flap lower skin 46 to the internal support rib 66. Loading through the link 68 is in tension (under normal operation) where it is reacted at each end of the link 68 through a standard pin, lug and clevis double shear arrangement. The shear load 116 resulting from the attachment of the link 68 and compression loads 112 to the internal support rib 66 acts on the internal support rib 66 and is reacted at the connections of between the front spar 60, the aft spar 62 and the mid spar 74 as a running load (shear flow). This shear flow reaction is typical of airplane multi-cell support rib reaction loading.

The reduced attachment footprint 32 of the hinge fitting 44 will also result in alleviation of load caused by a strain mismatch between the materials of the flap hinge assembly 30 and the flap box (e.g., front spar 60, aft spar 62 and mid spar 74) when subject to a non room temperature thermal environment. For example, under elevated or reduced temperatures, thermal loading is set-up between aluminum materials of the flap hinge assembly 30 and carbon fiber materials of the flap skins 64. The reduced attachment footprint 32 would also alleviate these undesirable thermal loads.

Figure 11:
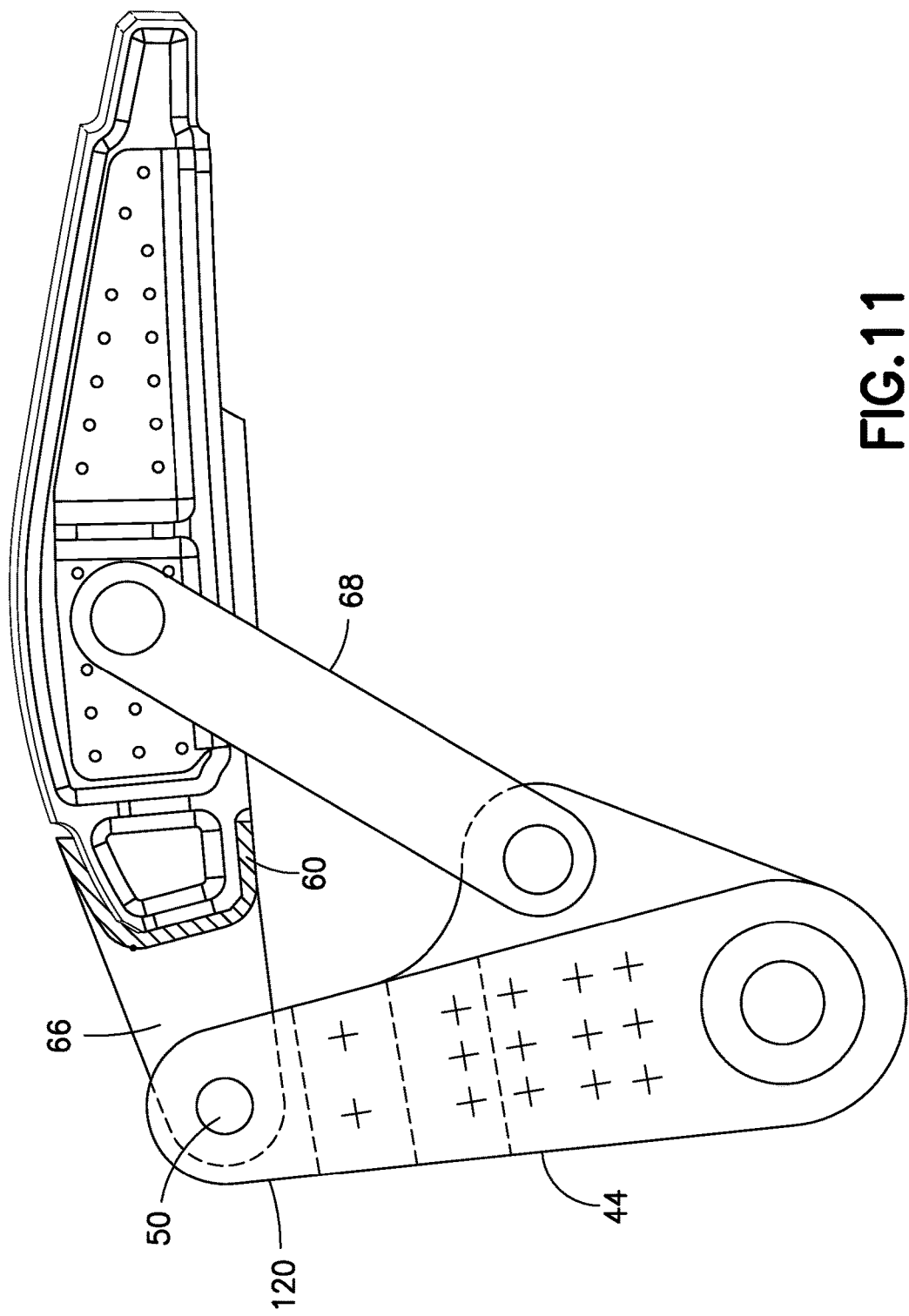
FIG. 11 is a side view (looking along the hingeline) of an alternative flap hinge assembly.

In a further aspect of the flap hinge assembly 30, a detectable failure feature for the link 68 may be incorporated to annunciate a failure of the link 68 to the pilot through existing skew detection systems. This would permit the link 68 to be designed as a unitary structure with a single load path instead of having primary and secondary load paths since it would then be detectable through twisting of the flap box. For example, as shown in FIG. 11, the upper portion 120 of the hinge fitting 44 where the actuation point 50 is located may be formed integral with the internal support rib 66 and the front spar 60 may be separated into two parts to attach on both sides of the internal support rib 66 to accommodate this. The remaining structure of the flap hinge assembly 30, with a link 68 passing through an aperture 70 in the flap lower skin 46 to connect the hinge fitting 44 to the internal support rib 66 remains the same as in the other figures to provide the small footprint 32 on the undersurface 34 of the flaps 17.

Figure 12:
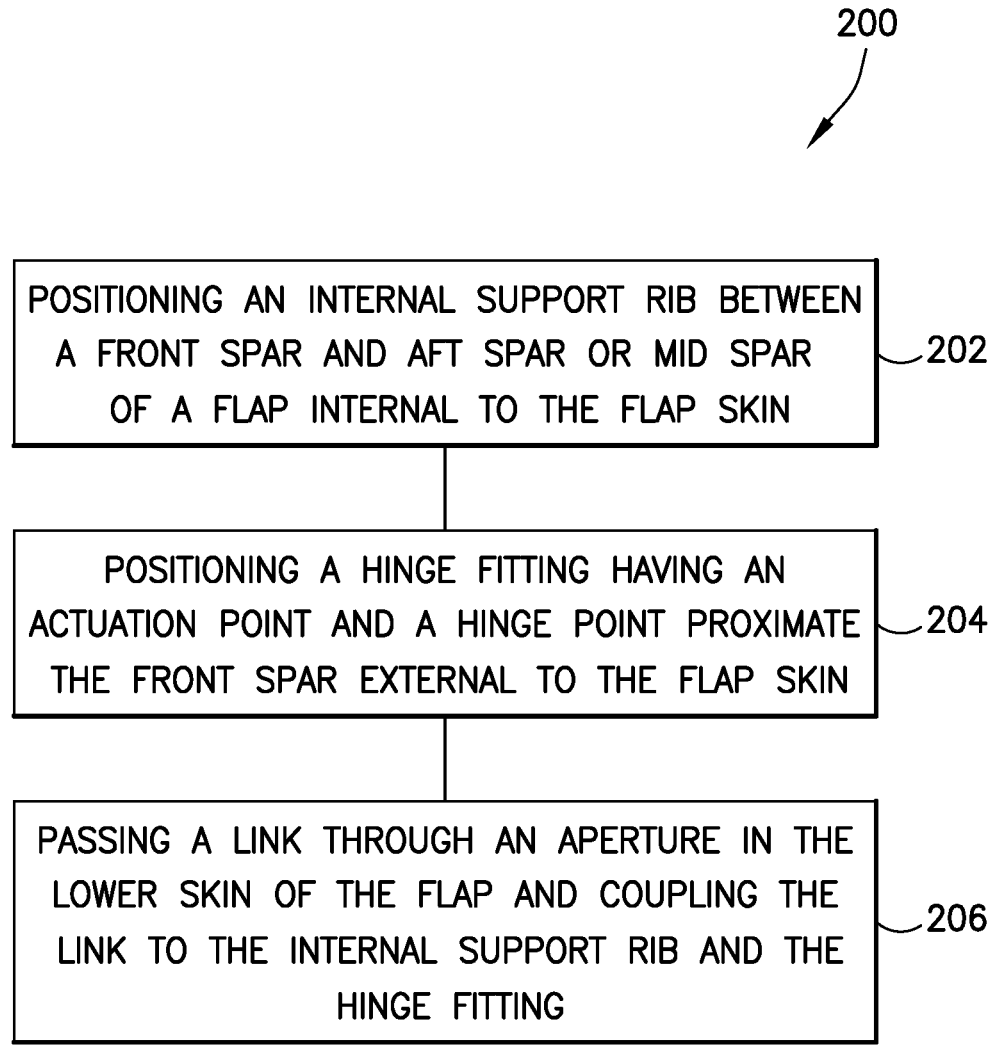
FIG. 12 is a flow chart of a method of reducing an external footprint of a support structure for pivotally mounting a flap to a trailing edge of an aircraft wing.

A further aspect of the disclosure relates to a method of reducing an external footprint 32 of a support structure for pivotally mounting a flap 17 to a trailing edge 22 of an aircraft wing 14, where the flap 17 has a front spar 60, an aft spar 62 and a plurality of ribs connecting the front spar 60 and the aft spar 62, and a flap skin 64 surrounding the front spar 60, the aft spar 62 and the plurality of ribs. In the method 200, referring to FIG. 12 step 202, an internal support rib 66 is positioned between the front spar 60 and the aft spar 62 of the flap 17 internal to the flap skin 64. In step 204, a hinge fitting 44 having an actuation point 50 and a hinge point 52 is positioned proximate the front spar 60 external to the flap skin 64. In step 206, a link 68 is passed through an aperture 70 in the lower skin 46 of the flap 17 and coupled to the internal support rib 66 and the hinge fitting 44, such that the bulk of the support structure is internal to the flap 17, and the external components of the support structure have a small external footprint 32.

Many other modifications and variations may of course be devised given the above description for implementing the principles in the present disclosure. For example, and without limitation, the flap hinge assembly 30 may be used with existing wing trailing edge connection structures in the Boeing 787 and new 777-8/9 aircraft or any other aircraft having a suitable structural beam extending below the wing lower skin 38, or the flap hinge point 52 may be readily modified to connect with other types of wing trailing edge connection structures. The flap hinge assembly 30 may also be used with any type of flap box structure comprising multiple spars, a plurality of ribs connecting between spars, and a skin surrounding the flap box structure. The internal support rib 66 of the flap hinge assembly 30 may be positioned between the front spar 60 and either an aft spar 62 or mid spar 74 of the flap box structure internal to the flap skin 64 taking into account flap size and design considerations. It is intended that all such modifications and variations be considered as within the spirit and scope of this disclosure, as defined in the following claims.

The invention claimed is:

1. A flap hinge assembly of a flap pivotally mounting the flap to a trailing edge of an aircraft wing, the flap having a flap box structure including a plurality of spars, a plurality of ribs connecting between the spars, and a skin surrounding the spars and the ribs, the flap hinge assembly comprising:
an internal support rib positioned between the spars of the flap box structure and internal to the skin of the flap;
a hinge fitting having an actuation point, a hinge point, a horizontal load transfer face and a vertical load transfer face, the horizontal load transfer face and the vertical load transfer face of the hinge fitting positioned external to the skin of the flap respectively about a horizontal flange and a vertical web of a front spar of the flap box structure; and
a link passing through an aperture in a lower skin of the flap for coupling the internal support rib internal to the skin to the hinge fitting external to the skin.

2. The flap hinge assembly of claim 1, wherein the hinge fitting extends external to the lower skin a chordwise distance from the front spar that is less than a distance between the front spar and a mid spar of the flap.

3. The flap hinge assembly of claim 1, wherein the horizontal load transfer face of the hinge fitting has a first length approximately equal to a second length of the horizontal flange of the front spar, and the vertical load transfer face of the hinge fitting has a third length that is approximately equal to a fourth length of the vertical web of the front spar.

4. The flap hinge assembly of claim 1, wherein the link comprises an elongated structure having a first hole at an upper end of the link and a second hole at a lower end of the link for coupling respectively to the internal support rib and the hinge fitting, the first hole positioned aft of the second hole.

5. The flap hinge assembly of claim 4, wherein the internal support rib comprises a link attachment point positioned proximate a mid spar of the flap for coupling the first hole of the link to the internal support rib.

6. The flap hinge assembly of claim 4, wherein the hinge fitting further comprises a connection flange for coupling the second hole of the link to the hinge fitting, the connection flange positioned between the hinge point and the horizontal load transfer face of the hinge fitting.

7. The flap hinge assembly of claim 6, wherein the first hole, the second hole and the hinge point are aligned in a straight line.

8. The flap hinge assembly of claim 7, wherein the straight line forms an aft angle relative to the lower skin that is greater than 90 degrees.

9. The flap hinge assembly of claim 5, wherein the link attachment point is positioned between the front spar and the mid spar of the flap.

10. The flap hinge assembly of claim 5, wherein the internal support rib comprises two webs connected together at a front region, a mid region and an aft region of the internal support rib to form spaces between the two webs, the link coupled in one of the spaces formed between the front region and the mid region.

11. A trailing edge flap for an aircraft wing comprising:
the flap comprising a flap box structure having a plurality of spars and a plurality of ribs connecting between the spars, a skin surrounding the flap box structure; and a flap hinge assembly for pivotally mounting the flap to a trailing edge of the aircraft wing, the flap hinge assembly comprising:
an internal support rib positioned between the spars of the flap box structure and internal to the skin;
a hinge fitting having an actuation point and a hinge point, the hinge fitting positioned proximate a front spar of the flap box structure external to the skin; and
a link comprising an elongated structure passing through an aperture in a lower skin of the flap and coupling the internal support rib through an upper end of the link to the hinge fitting through a lower end of the link external to the skin, the upper end of the link positioned aft of the lower end of the link.

12. The trailing edge flap of claim 11, wherein the hinge fitting extends external to the lower skin a chordwise distance from the front spar that is less than a distance between the front spar and a mid spar of the flap.

13. The trailing edge flap of claim 11, wherein the link comprises an elongated structure having a first hole and a second hole at respective ends of the link, the first hole and the second hole being coupled to the internal support rib and the hinge fitting respectively via pin joints acting in double shear.

14. The trailing edge flap of claim 13, wherein the hinge fitting further comprises a connection flange for coupling the second hole of the link to the hinge fitting, the connection flange positioned between the hinge point and a horizontal load transfer face of the hinge fitting.

15. The trailing edge flap of claim 13, wherein the internal support rib comprises a link attachment point positioned proximate a mid spar of the flap for coupling the first hole of the link to the internal support rib.

16. The trailing edge flap of claim 15, wherein the link attachment point is positioned between the front spar and the mid spar of the flap.

17. The trailing edge flap of claim 13, wherein the first hole, the second hole and the hinge point are aligned in a straight line.

18. The trailing edge flap of claim 17, wherein the straight line forms an aft angle relative to the lower skin that is greater than 90 degrees.

19. A method for pivotally mounting a flap to a trailing edge of an aircraft wing, the flap comprising a flap box structure having spars and ribs connecting the spars, and a flap skin surrounding the spars and the ribs, the method comprising the steps of:
positioning an internal support rib between the spars of the flap and internal to the flap skin;
positioning a hinge fitting having an actuation point, a hinge point, a horizontal load transfer face and a vertical load transfer face proximate a front spar and external to the flap skin such that the horizontal load transfer face and the vertical load transfer face are positioned respectively about a horizontal flange and a vertical web of the front spar;
passing a link through an aperture in a lower skin of the flap; and
coupling the link to the internal support rib internal to the skin and to the hinge fitting external to the skin.

20. The trailing edge flap of claim 11, wherein the hinge fitting further comprises a horizontal load transfer face and a vertical load transfer face positioned respectively about a horizontal flange of the front spar and a vertical web of the front spar.

* * * * *